(12) United States Patent
Johnson et al.

(10) Patent No.: US 7,704,430 B2
(45) Date of Patent: Apr. 27, 2010

(54) METHOD FOR MAKING A TREAD ASSEMBLY

(75) Inventors: Jeffrey L. Johnson, Beaverton, OR (US); Jang Rae Cho, Busan (KR)

(73) Assignee: Nike, Inc., Beaverton, OR (US)

( * ) Notice: Subject to any disclaimer, the term of this patent is extended or adjusted under 35 U.S.C. 154(b) by 603 days.

(21) Appl. No.: 11/422,258

(22) Filed: Jun. 5, 2006

(65) Prior Publication Data

US 2007/0278716 A1    Dec. 6, 2007

(51) Int. Cl.
*B29C 45/14* (2006.01)

(52) U.S. Cl. .................. 264/273; 264/247; 264/276

(58) Field of Classification Search ............ 264/247, 264/273, 276
See application file for complete search history.

(56) References Cited

U.S. PATENT DOCUMENTS

| | | | |
|---|---|---|---|
| 1,405,453 A | | 2/1922 | Somerville |
| 2,415,961 A | * | 2/1947 | Nast .................. 425/129.1 |
| 2,931,110 A | * | 4/1960 | Pietrocola ............ 36/30 R |
| 3,175,249 A | * | 3/1965 | Ferreira ............... 425/119 |
| 3,652,757 A | | 3/1972 | Wessel et al. |
| 4,309,376 A | | 1/1982 | Ueno et al. |
| 4,632,653 A | | 12/1986 | Plocher |
| 5,725,823 A | | 3/1998 | Finn et al. |
| 6,032,388 A | | 3/2000 | Fram |
| 6,071,454 A | | 6/2000 | Shimizu et al. |
| 6,255,235 B1 | | 7/2001 | Hiraoka et al. |
| 7,007,410 B2 | | 3/2006 | Auger et al. |
| 7,313,876 B2 | | 1/2008 | Morgan et al. |

OTHER PUBLICATIONS

Berins, M. L. (ed) Plastics Engineering Handbook of the Society of the Plastics Industry, 5th ed. New York: Van Norstrand Reinhold, 1991, ISBN 0442317999. Figures 5-20, 9-13, pp. 297.*ke
Berins, M.L. (ed) Plastics Engineering Handbook of the Society of the Plastics Industry, 5th ed. New York: Van Norstrand Reinhold, 1991, ISBN 0442317999. Figures 5-20, 9-13, pp. 156 and 269-271.
U.S. Appl. No. 11/422,254, filed Jun. 5, 2006.
Information Disclosure Statement filed Feb. 28, 2007 in U.S. Appl. No. 11/422,254.
Information Disclosure Statement filed Feb. 19, 2008 in U.S. Appl. No. 11/422,254.
Office Action mailed Dec. 23, 2008 in U.S. Appl. No. 11/422,254.
Information Disclosure Statement filed Feb. 1, 2009 in U.S. Appl. No. 11/422,254.
Amendment filed Mar. 23, 2009 in U.S. Appl. No. 11/422,254.
Final Office Action mailed May 27, 2009 from U.S. Appl. No. 11/422,254.
Request for Continued Examination and Amendment filed Aug. 27, 2009 from U.S. Appl. No. 11/422,254.
Office Action mailed Oct. 29, 2009 from U.S. Appl. No. 11/422,254.

* cited by examiner

*Primary Examiner*—Joseph S Del Sole
*Assistant Examiner*—Robert Dye
(74) *Attorney, Agent, or Firm*—Plumsea Law Group, LLC

(57) ABSTRACT

A method for making an article of footwear is disclosed. The method can include a number of steps where various molds are used to attach or mold a tread element onto a substrate or matrix lining. The tread element can be formed by compressing a rubber block between various molding members to cause the resulting rubber material to flow through at least one injection cavity, which penetrates through holes in the matrix lining, into at least one lug cavity disposed on the side of the matrix lining opposite to the injection cavity. The rubber material eventually enters the lug cavity and becomes attached to the matrix lining.

35 Claims, 10 Drawing Sheets

METHOD FOR MAKING A TREAD ASSEMBLY

BACKGROUND OF THE INVENTION

1. Field of the Invention

The present invention relates generally to articles of footwear, and in particular to a method for creating outsoles.

2. Description of Related Art

Methods for constructing a tread assembly, which is a set of rubber projections fixed in place to a thin and flexible matrix lining, such as those used for shoe outsoles, have been previously disclosed.

Fram (U.S. Pat. No. 6,032,388) discloses a method in which an inelastic sheet material is provided with a pattern of perforations through it, and a plurality of tread elements are created. The sheet material is placed in a molding machine with tread forming cavities below the sheet material. Following this, tread material is injected into tread forming cavities. The tread forming material flows out of the tread forming cavities and through the perforated sheet material into molding cavities which have been secured just under the sheet material. The tread is injected through the perforations in such a manner so that some of the resultant tread elements have anchoring portions extending through the sheet material from an opposite side of the material.

Hiraoka (U.S. Pat. No. 6,562,271) discloses a method in which a male and female mold are engaged with each other in order to form a nonslip member, composed of a base fabric and nonslip convexes. The nonslip convex includes a peripheral edge that reinforces anchoring between the nonslip convex and the base fabric. A plate-like material is inserted between the male and female molds, and by engaging these molds a large number of small pieces coincident to a shape of through holes of the female mold are punched out from the plate-like material. These small pieces are then bridged and fixed to the base fabric to serve as the tread of the non-slip member. This method of manufacturing tread elements includes multiple steps.

There is currently a need for a method for making a tread assembly that is more efficient, while at the same time, allowing for a great deal of variation or flexibility in terms of the composition of the material that will eventually compose the tread assembly. In particular, a method is needed that can reduce the number of steps used in manufacturing a tread assembly, even complex tread assemblies.

SUMMARY OF THE INVENTION

The invention discloses a method of making a tread assembly. In one aspect, the invention includes a method of making an article of footwear comprising the steps of: associating a matrix lining with a first side of a central mold, a first surface of the matrix lining confronting the first side of the central mold, the matrix lining also including a second surface disposed opposite the first surface; placing a rubber forming block proximate a second side of the central mold; compressing the rubber forming block and causing a portion of the rubber forming block to become viscous and flow through at least one injection cavity disposed in the central mold; where the portion of the rubber forming block continuing to flowing through a hole disposed in the matrix lining and flowing into a lug cavity; and where the portion of the rubber forming block fills the lug cavity and contacts the second surface of the matrix lining.

In another aspect, the step of compressing the rubber forming block includes a step of moving a molding press towards the central mold.

In another aspect, the portion of the rubber forming block that fills the lug cavity does not extend beyond the first surface of the matrix lining.

In another aspect, the lug cavity is disposed on a molding base.

In another aspect, the portion of the rubber forming block becomes a tread element.

In another aspect, the matrix lining is attached to an outsole of the article of footwear.

In another aspect, the invention includes a method of making an article of footwear comprising the steps of: associating a matrix lining with a first side of a central mold, a first surface of the matrix lining confronting the first side of the central mold, the matrix lining also including a second surface disposed opposite the first surface; placing a first rubber forming block proximate a second side of the central mold; placing a second rubber forming block proximate the second side of the central mold, wherein the second rubber forming block is different than the first rubber forming block; compressing the first rubber forming block and causing a first portion of the first rubber forming block to become viscous and flow through a first injection cavity disposed in the central mold; compressing the second rubber forming block and causing a second portion of the second rubber forming block to become viscous and flow through a second injection cavity disposed in the central mold; where the first portion of the first rubber forming block fills a first lug cavity and contacts the second surface of the matrix lining, and where the second portion of the second rubber forming block fills a second lug cavity and contacts the second surface of the matrix lining.

In another aspect, the step of compressing the rubber forming block includes a step of moving a molding press towards the central mold.

In another aspect, the first rubber forming block is placed in first central cavity indent and wherein the second rubber forming block is placed in second cavity indent.

In another aspect, a first pressing surface disposed on molding press is configured to engage first central cavity indent and wherein a second pressing surface disposed on the molding press is configured to engage second central cavity indent.

In another aspect, the first lug cavity is laterally spaced from the second lug cavity.

In another aspect, the first and second lug cavities are disposed on a molding base.

In another aspect, the matrix lining is attached to an outsole of the article of footwear.

In another aspect, the invention includes a method of making an article of footwear comprising the steps of: placing a first rubber forming block proximate a second side of the central mold and placing a second rubber forming block proximate the second side of the central mold, wherein the second rubber forming block is different than the first rubber forming block; compressing both the first rubber forming block and the second rubber forming block simultaneously; thereby causing a first portion of the first rubber forming block to become viscous and flow through the matrix lining and also causing a second portion of the second rubber forming block to become viscous and flow through the matrix lining.

In another aspect, the first portion of the first rubber forming block flows through a first injection cavity after the compression step.

In another aspect, the second portion of the second rubber forming block flows through a second injection cavity after the compression step.

In another aspect, the first rubber forming block is harder than the second rubber forming block.

In another aspect, the first rubber forming block has a different color than the second rubber forming block.

In another aspect, the first rubber forming block has a different composition than the second rubber forming block.

In another aspect, the matrix lining is attached to an outsole of an article of footwear.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

A method for creating a tread assembly is disclosed. In particular, this tread assembly may be used as an outsole for an article of footwear. The tread assembly is made of a matrix lining that is joined to rubber projections to provide lightweight grip and support. In some embodiments, the matrix lining may be a synthetic fabric, for example. In many cases, it will be important that the matrix lining be thin, flexible, durable, and lightweight. The tread elements may be convex in shape, but any three dimensional shape is possible. This tread assembly could be used in any kind of footwear. This tread assembly is certainly not limited to shoe outsoles, as it may be used to form elements that provide extra grip in gloves in some embodiments.

Figure 1:
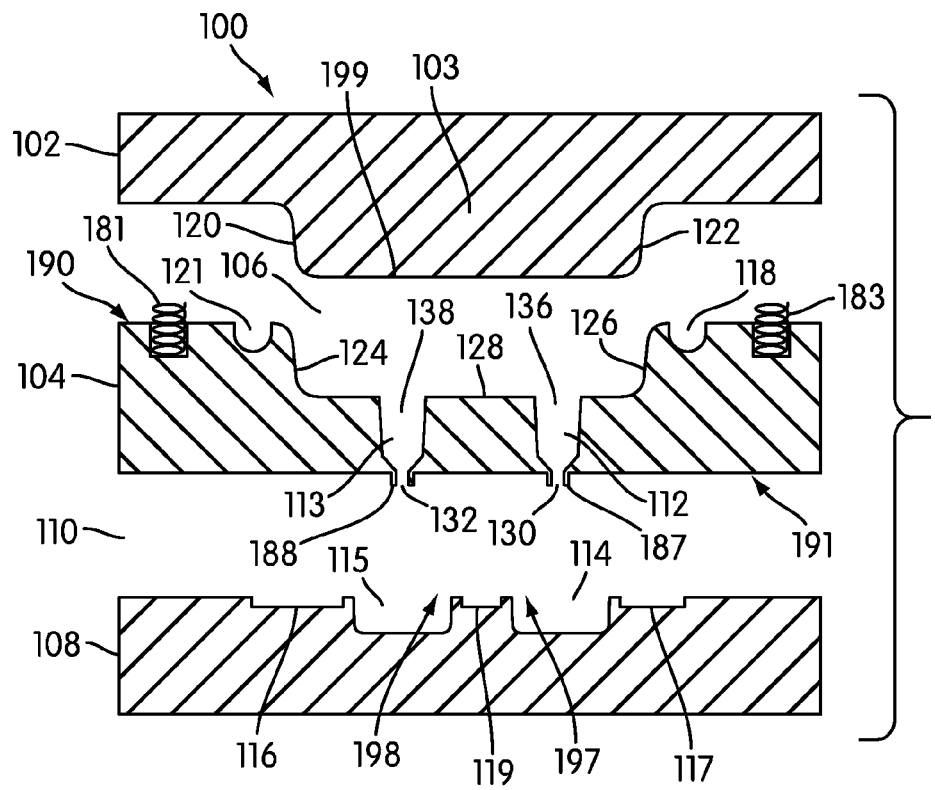
FIG. 1 is a schematic diagram of a preferred embodiment of a molding system.

FIG. 1 is a schematic diagram of a preferred embodiment of a manufacturing system 100 that can be used to create a tread assembly. Molding press 102 is disposed adjacent to central mold 104. Molding press 102 includes press extension 103. Press extension 103 includes a pressing surface 199 that extends towards central mold 104. Press extension 103 is formed by first extension wall 120 and second extension wall 122. Press extension 103 can also include other extension walls as well. In particular, press extension 103 may include a forward and rear wall, not seen in this schematic diagram of molding press 100. Press extension 103 corresponds to a central cavity 106 disposed in central mold 104. In a preferred embodiment, central cavity 106 is disposed on the second side 190 of central mold 104. Central cavity 106 includes first central cavity wall 124 and second central cavity wall 126 along with central cavity floor 128. Central cavity 106 may also include a forward wall and rear wall that are not shown in this schematic diagram of molding system 100. Molding press 102 may move independently of central mold 104.

On a first side 191 of central mold 104, molding base 108 is disposed near central mold 104, forming gap 110. The distance between molding base 108 and central mold 104 can be varied. In particular, both molding press 102 and molding base 108 can be moved closer to central mold 104, in some cases molding press 102 and molding base 108 can be moved to contact central mold 104. In some embodiments, the items comprising manufacturing system 100 can be made of a metallic material.

Central mold 104 includes first injection cavity 112 and second injection cavity 113. First injection cavity 112 includes first injection tip 187, which protrudes from central mold 104. Second injection cavity 113 includes second injection tip 188, which protrudes from central mold 104. Preferably, first injection cavity 112 is in fluid communication with central cavity 106 via first upper orifice 136. First injection cavity 112 is also in fluid communication with gap 110 via first lower orifice 130. This arrangement allows a liquid or viscous substance to pass between central cavity 106 and gap 110, through first injection cavity 112. Likewise, second injection cavity 113 is preferably in fluid communication with central cavity 106 by way of second upper orifice 138. Second injection cavity 113 is also in fluid communication with gap 110 by way of second lower orifice 132. This arrangement allows a liquid or viscous substance to pass between central cavity 106 and gap 110, through second injection cavity 113.

The diameters of first lower orifice 130 and second lower orifice 132 are constrained by two competing factors. The first factor relates to the amount of flow between first injection cavity 112 and gap 110. The larger the diameter, the better the flow. However, a second factor must also be considered. In order to obtain an aesthetically pleasing tread element, one that has a minimal amount of excess material or obvious signs of first lower orifice 130, the diameter should be kept as small as possible. In some embodiments, first lower orifice 130 and second lower orifice 132 may comprise diameters less than 3 mm. In a preferred embodiment, first lower orifice 130 and second lower orifice 132 may comprise diameters between 0.5 mm and 1.5 mm. In the embodiment shown here, the diameter of first lower orifice 130 and second lower orifice 132 is 1 mm. Throughout the rest of this specification, any orifice that allows for fluid communication between an injection cavity and a gap, disposed between a central cavity and a molding base, comprises a diameter of 1 mm.

Molding base 108 includes first lug cavity 114 and second lug cavity 115. First lug cavity 114 and the second lug cavity 115 are exposed to gap 110 via first lug opening 197 and second lug opening 198. In the embodiment shown in FIG. 1, first lug cavity 114 and second lug cavity 115 are rectangular, however these cavities can assume any shape including but not limited to typical shapes found on the outsoles of many shoes. In addition, molding base 108 is equipped with first lining recess 116, second lining recess 117 and third lining recess 119.

In FIG. 1, only two injection and lug cavities are shown, however in some embodiments many more injection and lug cavities may be included. In particular, first injection cavity 112 and first lug cavity 114 may be associated with a set of injection and lug cavities which may extend in the direction perpendicular to molding system 100 as seen in FIG. 1.

Figure 2:
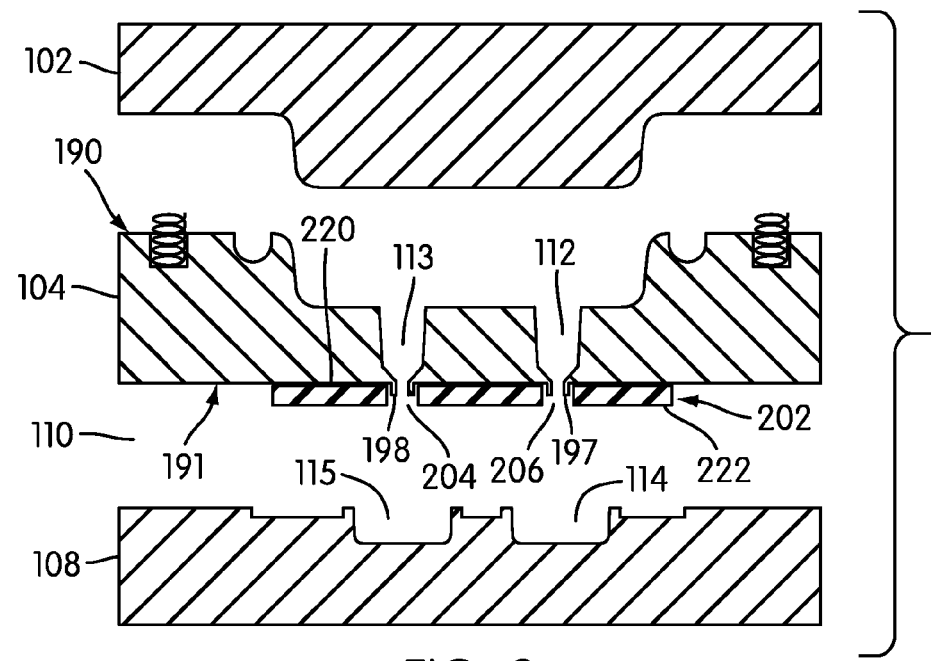
FIG. 2 is a schematic diagram of a preferred embodiment of a molding system with matrix lining attached.

Referring to FIG. 2, a preferred embodiment of a step for making a tread assembly is shown. First, a matrix lining 202 is associated with central mold 104. In particular, a first side 220 of matrix lining 202 is disposed against first side 191 of central mold 104. A second surface 222 of matrix lining 202 is disposed to face gap 100. The placement of matrix lining 202 against central mold 104 can be achieved by sliding matrix lining 202 into place through gap 110, or by first moving molding base 108 away from central mold 104 and then returning molding base 108 after matrix lining 202 has been added. It may be preferable to fix matrix lining 202 in place to assure proper alignment with first lug cavity 114 and second lug cavity 115. In some embodiments, matrix lining 202 may be clamped to central mold 104 or held in place with an adhesive.

In some embodiments, matrix lining 202 can include holes. In some embodiments, these holes in matrix lining 202 can be associated or aligned with a corresponding injection tip disposed on central mold 104.

Matrix lining 202 represents any suitable material. In some embodiments, matrix lining 202 may be composed of any of the following materials, either singularly or as a composition of two or more of the following materials: un-buffered textile, leather, synthetic material, suede, or an open mesh. In general, matrix lining 202 may be composed of any type of material used in manufacturing uppers. In a preferred embodiment, matrix lining 202 is composed of a buffered textile. Throughout the specification other matrix linings may also be composed of these materials.

Referring to FIG. 2, first injection tip 197 may be inserted through first lining hole 206. Second injection tip 198 may also be inserted into through second lining hole 204. This allows for liquefied rubber to pass through matrix lining 202 into first lug cavity 114 and second lug cavity 115.

Figure 3:
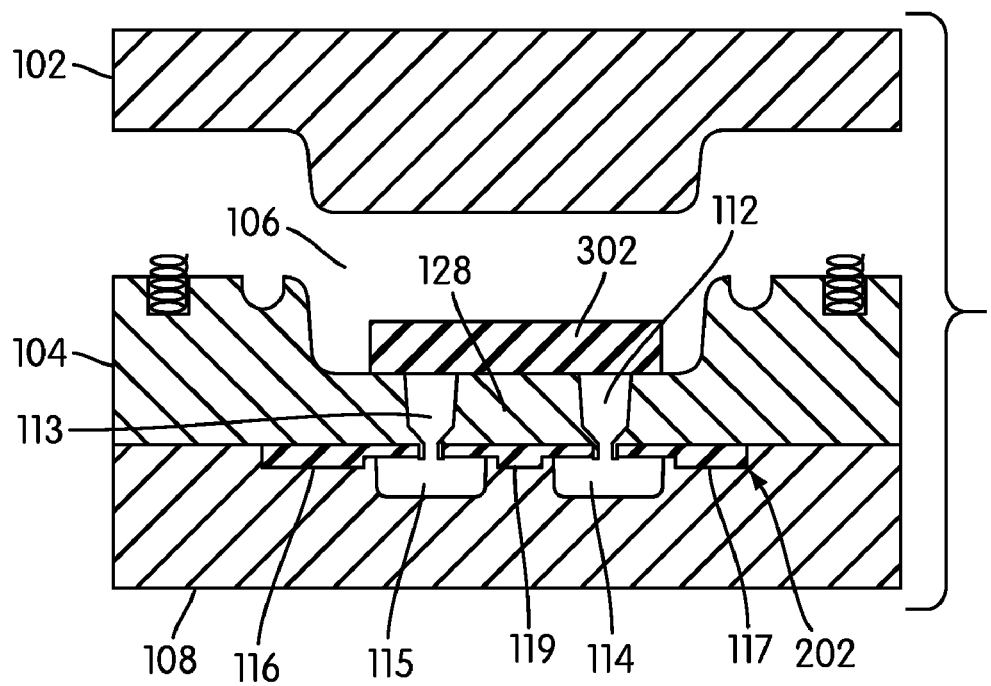
FIG. 3 is a schematic diagram of a preferred embodiment of a molding system with molding base compressed against central mold.

FIG. 3 is a schematic diagram of a preferred embodiment of another step, where the movement of central mold 104 towards molding base 108 is accomplished. During this movement, portions of matrix lining 202 fill first lining recess 116, second lining recess 117, and third lining recess 119. In some embodiments, portions of central mold 104 will be in contact with molding base 108 after this movement step. Preferably molding base 108 will be positioned with respect to central mold 104 in such a way that matrix lining 202 is exposed to first lug cavity 114 and second lug cavity 115.

At this point, a rubber forming block 302 is preferably placed in central cavity 106. Rubber forming block 302 may rest on central cavity floor 128. This rubber forming block 302 may be any type of solid material that can enter first injection cavity 112 and second injection cavity 113 under the designed heat and pressure exerted by manufacturing system 100.

Rubber forming block is generally composed of the kinds of rubber that are normally used to form the outsoles of shoes and other articles of footwear. In one embodiment, rubber forming block 302 is composed of Duralon©, which is a blown rubber having a specific gravity less than one. In other embodiments, other types of rubber may be used, including rubber compositions with a specific gravity greater than one. In some embodiments, rubber forming block 302 may be substituted with a block of any material that can flow and cure. That is, the block used to create tread elements need not be rubber. In general, materials with very high expansion rates and very high shrinkage rates are not suitable for this process. Therefore, any material with low expansion rates and low shrinkage rates, that can also flow and cure, are suitable. Throughout the specification, other rubber forming blocks that are disclosed may be composed of similar suitable materials.

Figure 4:
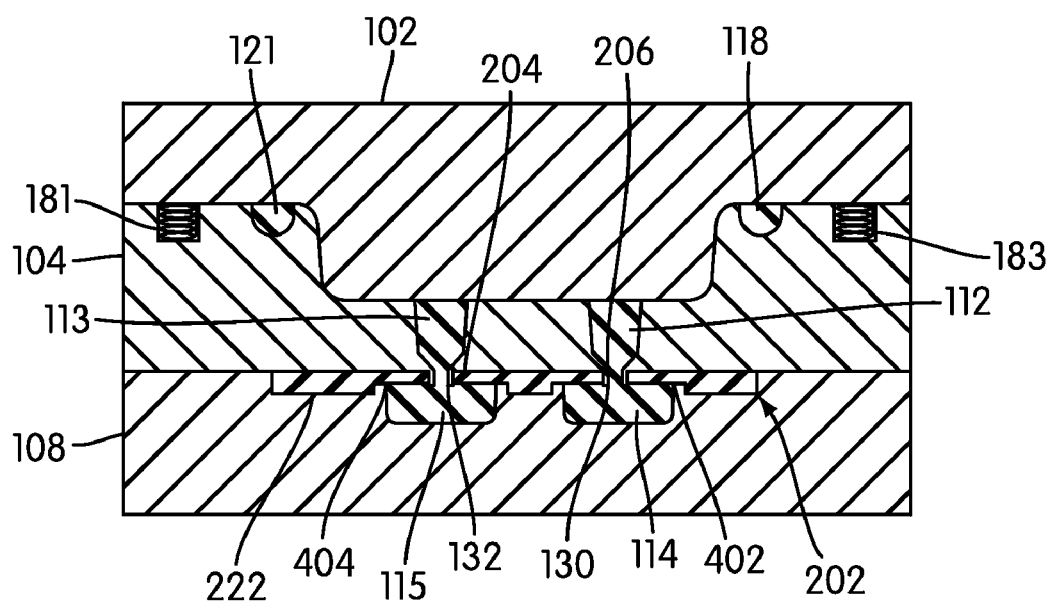
FIG. 4 is a schematic diagram a preferred embodiment of the compression of molding press with central mold.

FIG. 4 is a schematic diagram of a preferred embodiment of the compression of molding press 102 with central mold 104. This compression, along with a heating process, liquefies rubber forming block 302. This liquid is then pressed through first injection cavity 112 and second injection cavity 113. Some of the liquid entering first injection cavity 112 eventually enters first lug cavity 114, passing through first lining hole 206, via first lower orifice 130. Likewise, some of the liquid entering second injection cavity 113 eventually enters second lug cavity 115, passing through second lining hole 204, via second lower orifice 132. Simultaneously, excess liquid can be gathered in first molding recess 118 and second molding recess 121. In embodiments including first spring 181 and second spring 183, these springs may be depressed during this step of compression. Preferably, enough liquid or viscous substance is supplied to fill first lug cavity 114 and second lug cavity 115 in such a manner that the liquid or viscous substance is in contact with portions of second side 222 of matrix lining 202.

In a preferred embodiment of molding system 100, first lug cavity rim 402, which preferably extends around the entire periphery of first lug cavity 114, is preferably in contact with matrix lining 202 under enough pressure so that no liquefied rubber escapes the region enclosed by first lug cavity rim 402. In a similar manner, second lug cavity rim 404, which preferably extends around the entire outer periphery of second lug cavity 115, is preferably in contact with matrix lining 202 under enough pressure so that no liquefied rubber escapes the region enclosed by second lug cavity rim 404.

Preferably, manufacturing system 100 includes provisions that provide a pressure relief or pressure imbalance so that excess pressure does not cause manufacturing defects. Some embodiments include first molding recess 118 and second molding recess 121. These recesses can be used to collect excess molding material, for example liquefied rubber if rubber is used. First and second molding recesses 118 and 121 help to prevent excess rubber from seeping between any of the lug cavities and matrix lining 202.

In other embodiments, first molding recess 118 and second molding recess 121 are replaced with springs. In a preferred embodiment, manufacturing system 100 may include a first molding spring 181 and a second molding spring 183. First molding spring 181 may be disposed outward of first molding recess 118 or first molding spring 181 may replace first molding recess 118. Second molding spring 183 may be disposed outward of second molding recess 121 or second molding spring 183 may replace second molding recess 121. First molding spring 181 and second molding spring 183 are each preferably attached to central mold 104. These molding springs 181 and 183, preferably engage molding press 102 when molding press 102 is moved closer to central mold 104. These springs 181 and 183 preferably act to create a pressure imbalance that creates narrow gaps between molding press 102 and central mold 104. This allows excess liquid to escape through these narrow regions, as opposed to seeping between the lug cavities and matrix lining 202. Throughout this specification, molding recesses may be replaced by a molding spring, thus providing the pressure imbalance function described here.

As the rubber material cools, it attaches to second side 222 of matrix lining 802. After the cooling of the rubber material is complete, central mold 104 can be separated from molding base 108, yielding tread assembly 502, seen in FIG. 5. This separation can be performed by either lowering molding base 108 or raising central mold 104. What remains is tread assembly 502, which includes is matrix lining 202 adjoined with first tread element 504 and second tread element 506. First tread element base 510 of first tread element 504 is no larger than the width of first lug cavity rim 402, and second tread element base 512 of second tread element 506 is no larger than the width of second lug cavity rim 404.

As some additional rubber material may be attached from rubber material which has solidified in first injection cavity 112 and second injection cavity 113, some means of removing this excess material may be desired. It is unlikely however that such excess material will interfere with the performance of tread assembly 502. In this particular embodiment, first rubber projection 504 and second rubber projection 506 are rectangular in shape but any shape can be made using first lug cavity 114 and second lug cavity 115. Such shapes may include tetrahedrons, cylinders, or rectangles. Irregular shapes may also be used. Since the composition of rubber forming block 302 may be modified, the composition of first rubber projection 504 and second rubber projection 506 can likewise be modified. This is a useful attribute since some tread assemblies may require the use of more durable rubber, while others may require the use of more flexible material.

The size of lug cavities is also unrestricted in this method. Although first lug cavity 114 and second lug cavity 115 are identical in size and shape, this need not be true in other embodiments. Some embodiments may have lug cavities in a variety of shapes and sizes and lug cavities that are different from one another.

Figure 5:
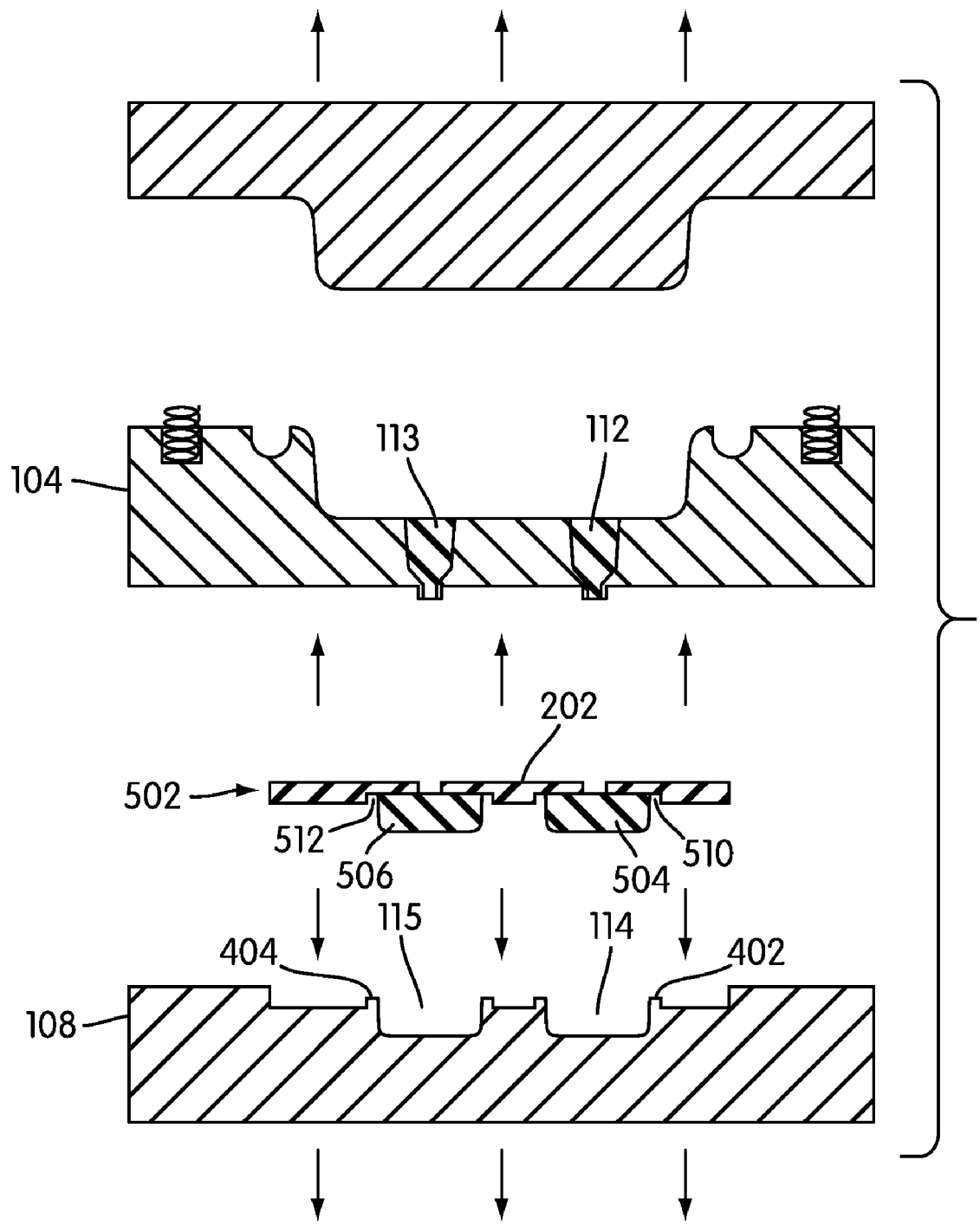
FIG. 5 is a schematic diagram a preferred embodiment of a tread assembly.

Tread assembly 502, as seen in FIG. 5, includes only two tread elements. In other embodiments, tread assembly 502 may comprise a matrix lining with multiple tread elements. These tread elements could be simultaneously formed and joined to a matrix lining by modification of central mold 104 to include multiple injection cavities and lug cavities.

Figure 6:
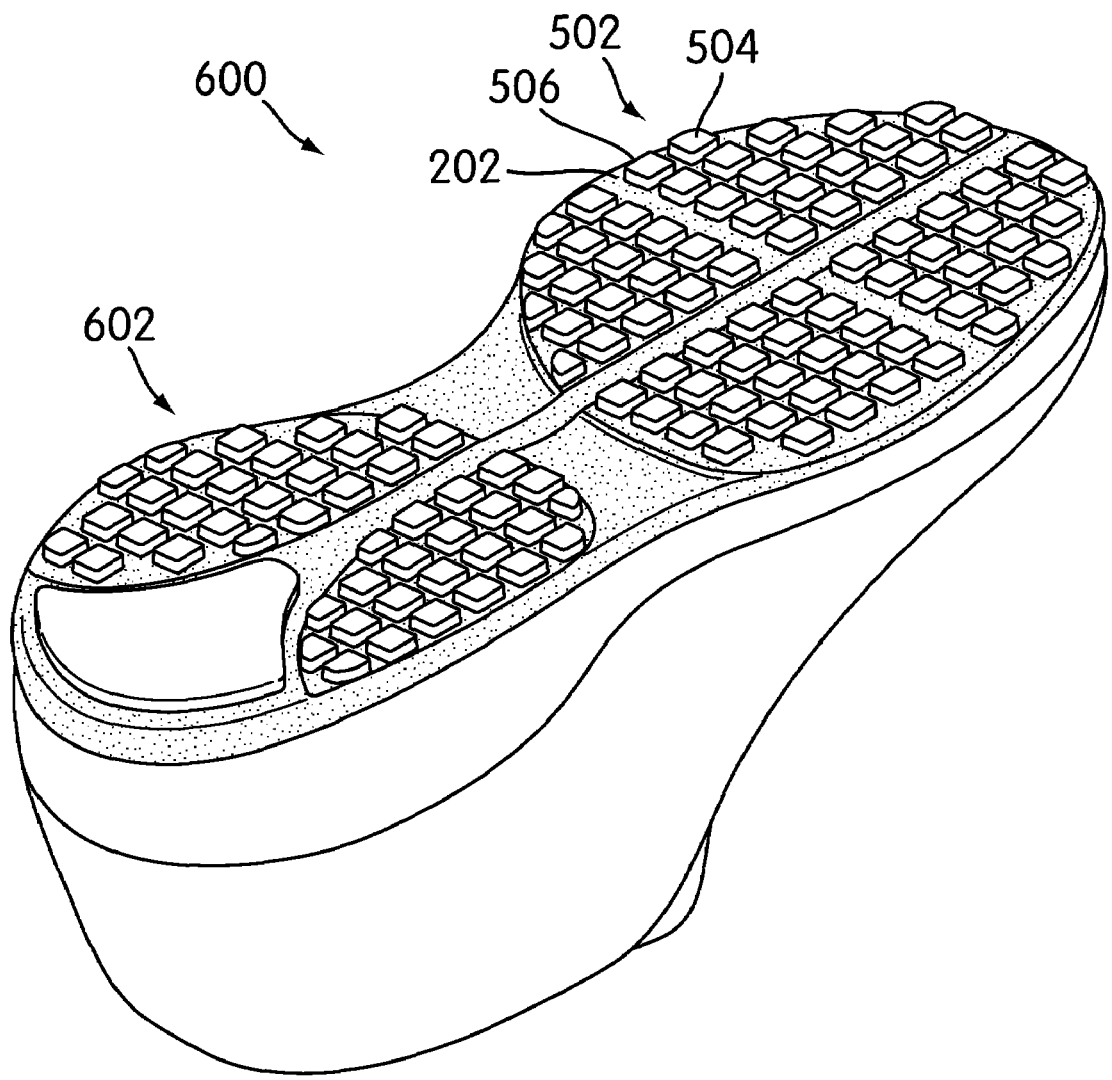
FIG. 6 is a preferred embodiment of a shoe with tread assembly displayed as an outsole.

FIG. 6 is a preferred embodiment of an article of footwear 600. Here, tread assembly 502 has been attached to article of footwear 600 to form a portion of tread pattern 602 of article of footwear 600. Tread assembly 502 includes tread elements 504 and 506. Tread assembly 502 is joined to article of footwear 600 by matrix lining 202. Tread elements 504 and 506 are seen to be rectangular in this embodiment. Tread pattern 602 of article of footwear 600 can any design, including various shapes and sizes of tread elements.

In another embodiment, the tread assemblies can be varied in a number of ways. In some embodiments, different colored rubber forming blocks can be used simultaneously to create multi-colored tread elements. In other embodiments, several rubber blocks with different material composition can be used simultaneously. The resulting tread elements will likewise have varying colors and/or compositions within the same tread assembly.

This may be useful in designing outsoles where regions of tread that will be in contact with the ground most often must be made of a more durable rubber composition, while other regions that receive less wear can be designed with a more flexible rubber composition. Also, with aesthetics of particular importance in designing footwear, the ability to create a multi-colored tread in one step allows for more decorative patterns without a decrease in the production efficiency.

Figure 7:
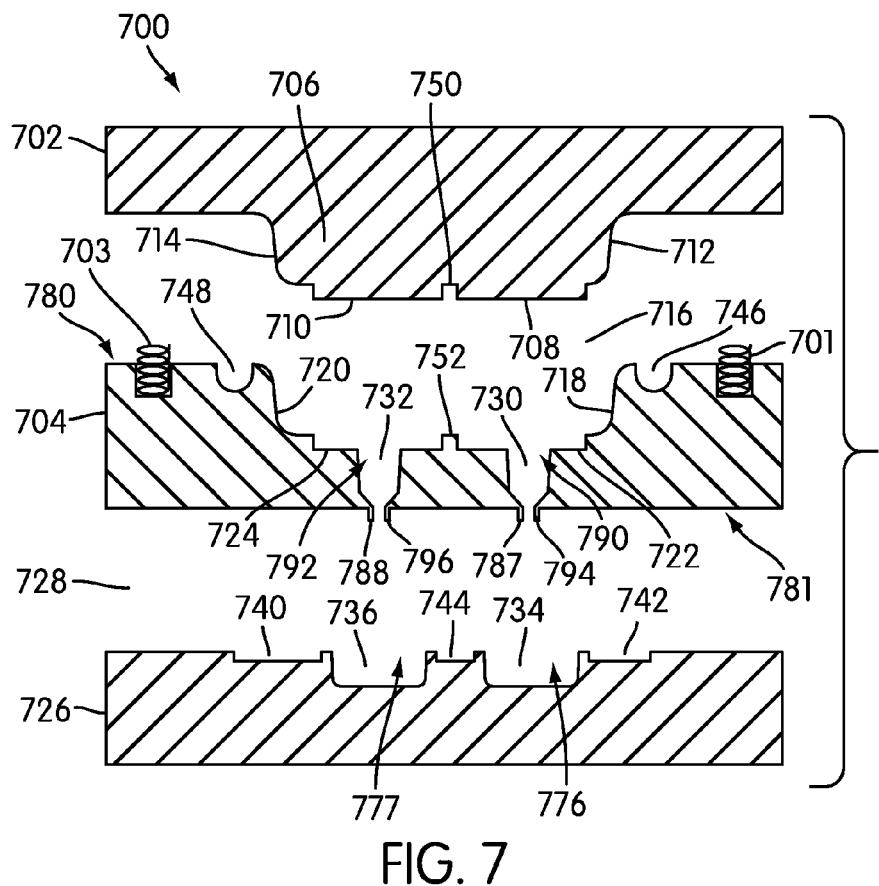
FIG. 7 is a schematic diagram of a preferred embodiment of a molding system.

FIG. 7 is a schematic diagram of a preferred embodiment of a manufacturing system 700 used to create a tread assembly. Molding press 702 is disposed adjacent to central mold 704. Molding press 702 preferably includes press extension 706. Press extension 706 includes a first pressing surface 708 and a second pressing surface 710, each extending towards central mold 704. Press extension 706 is formed by first extension wall 712 and second extension wall 714. Press extension 706 is preferably also composed of a forward and rear wall, not shown in the schematic diagram of this embodiment of manufacturing system 700. Press extension 706 can also include other extension walls as well. Press extension 706 corresponds with a central cavity 716 disposed in central mold 104. In a preferred embodiment, central cavity 716 is disposed on second side 780 of central mold 704. Central cavity 716 includes first central cavity wall 718 and second central cavity wall 720 along with first central cavity indent 722 and second central cavity indent 724. Central cavity 716 also preferably includes a forward and rear wall not shown in this schematic view of this embodiment of manufacturing system 700. Molding press 702 may move independently of central mold 704, and in some cases first pressing surface 708 and second pressing surface 710 may contact first central cavity indent 722 and second central cavity indent 724.

On first side 781 of central mold 704, a molding base 726 is disposed near central mold 704, forming gap 728. The distance between molding base 726 and central mold 704 can be varied. In particular, both molding press 702 and molding base 726 can be moved closer to central mold 704, in some cases molding press 702 and molding base 726 can be moved to contact central mold 704. In some embodiments the items comprising manufacturing system 700 can be made of a metallic material.

Central mold 704 includes first injection cavity 730 and second injection cavity 732. First injection cavity 730 includes first injection tip 787, which protrudes from central mold 704. Second injection cavity 732 includes second injection tip 788, which protrudes from central mold 704. Preferably, first injection cavity 730 is in fluid communication with central cavity 706 via first upper orifice 790. First injection cavity 730 is also in fluid communication with gap 728 via first lower orifice 794. This arrangement allows a liquid or viscous substance to pass between central cavity 706 and gap 728, through first injection cavity 730. Likewise, second injection cavity 732 is preferably in fluid communication with central cavity 706 by way of second upper orifice 790. Second injection cavity 732 is also in fluid communication with gap 728 by way of second lower orifice 796. This arrangement allows a liquid or viscous substance to pass between central cavity 706 and gap 728, through second injection cavity 732.

Molding base 726 includes first lug cavity 734 and second lug cavity 736. First lug cavity 734 is laterally spaced from second lug cavity 736. First lug cavity 734 and second lug cavity 736 are exposed to gap 728 via first lug opening 776 and second lug opening 777. In the embodiment shown in FIG. 7, first lug cavity 734 and second lug cavity 736 are rectangular, however these cavities can assume any shape including but not limited to typical shapes found on the outsoles of many shoes. In addition, molding base 726 is equipped with first lining recess 740, second lining recess 742 and third lining recess 744. Central mold 704 additionally includes first molding recess 746 and second molding recess 748. Some embodiments additionally include first spring 701 and second spring 703.

In FIG. 7, only two injection and lug cavities are shown, however in some embodiments many more injection and lug cavities may be included. In particular, first injection cavity 730 and first lug cavity 734 may be associated with a set of injection and lug cavities which may extend in the direction perpendicular to molding system 700 as seen in FIG. 7.

Figure 8:
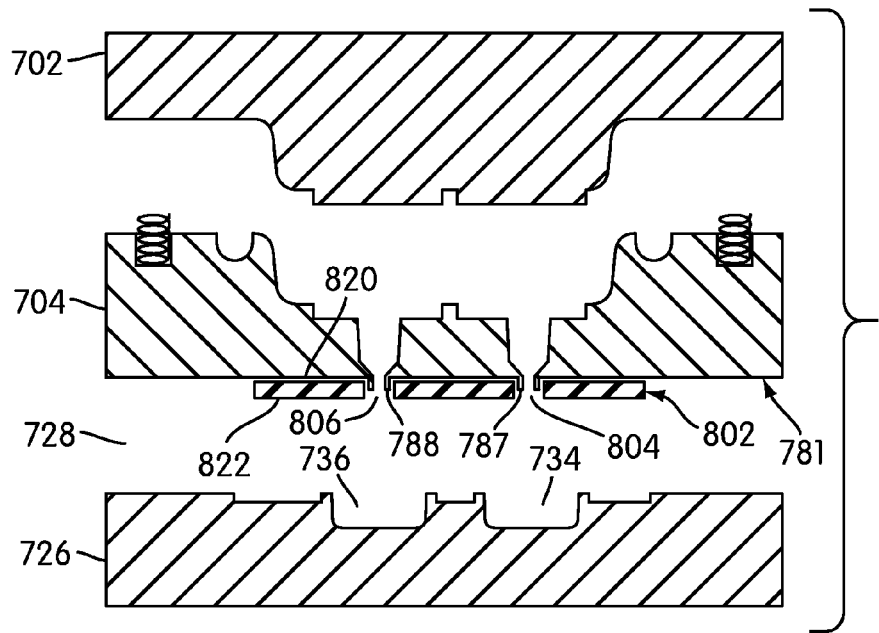
FIG. 8 is a schematic diagram of a preferred embodiment of a molding system with matrix lining attached.

Referring to FIG. 8, a preferred embodiment of a step for making a tread assembly is shown. First, a matrix lining 802 is associated with central mold 704. In particular, a first side 820 of matrix lining 802 is disposed against first side 781 of central mold 704. A second surface 822 of matrix lining 802 is disposed to face gap 728. The placement of matrix lining 802 against central mold 704 can be achieved by sliding matrix lining 802 into place through gap 728, or by first moving molding base 726 away from central mold 704 and then returning molding base 726 after matrix lining 802 has been added. It may be preferable to fix matrix lining 802 in place to assure proper alignment with first lug cavity 734 and second lug cavity 736. In some embodiments, matrix lining 802 may be clamped to central mold 704 or held in place with an adhesive.

In some embodiments, matrix lining 202 can include holes. In some embodiments, these holes in matrix lining 202 can be associated or aligned with a corresponding injection tip disposed on central mold 104.

As seen in FIG. 8, first injection tip 787 may be inserted through first lining hole 804. Second injection tip 788 may also be inserted into through second lining hole 806. This allows for liquefied rubber to pass through matrix lining 802 into first lug cavity 734 and second lug cavity 736. Matrix lining 202 may be a synthetic fiber, or any material which is lightweight and flexible.

Figure 9:
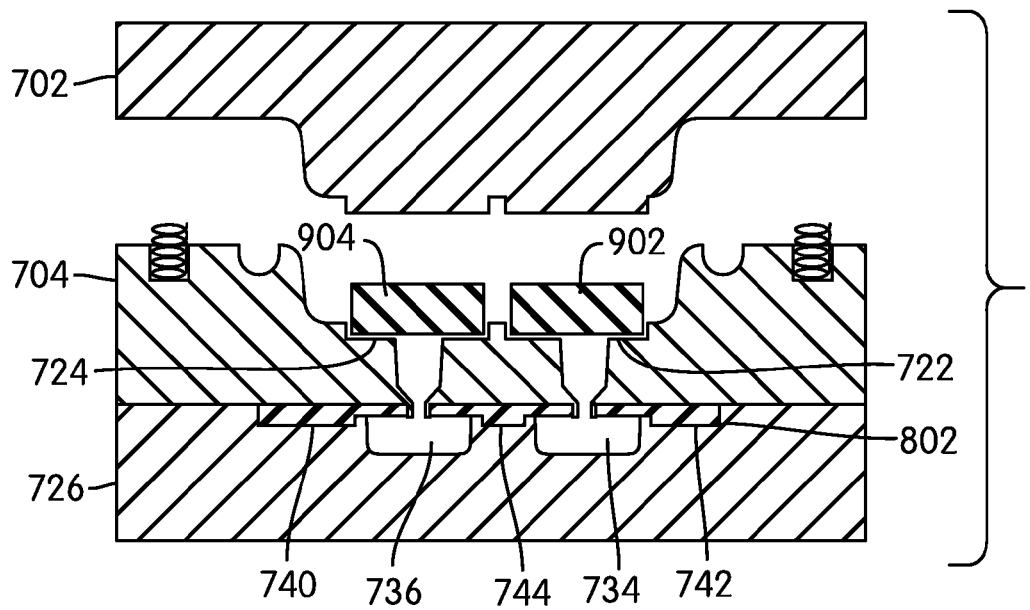
FIG. 9 is a schematic diagram of a preferred embodiment of a molding system with molding base compressed against central mold.

FIG. 9 is a schematic diagram of a preferred embodiment of another step where the movement of central mold 704 towards molding base 726 is accomplished. During this movement, portions of matrix lining 802 fill first lining recess 740, second lining recess 742, and third lining recess 744. [why?] In some embodiments, portions of central mold 704 will be in contact with molding base 726 after this compression step. Preferably, molding base 726 will be positioned with respect to central mold 704 in such a way that matrix lining 802 is exposed to first lug cavity 734 and second lug cavity 736.

At this point a first rubber forming block 902 is preferably placed in first central cavity indent 722 and a second rubber forming block 904 is preferably placed in second central cavity indent 724. First rubber forming block 902 and second rubber forming block 904 may be made of similar material and color. In some embodiments, first rubber forming block 902 and second rubber forming block 904 may be made of different materials or colors. In some embodiments, first rubber forming block 902 is harder than second rubber forming block 904. In some embodiments, first rubber forming block 902 has a different color than second rubber forming block 904. In some embodiments, first rubber block 902 is made of a different material than second rubber forming block 904.

Figure 10:
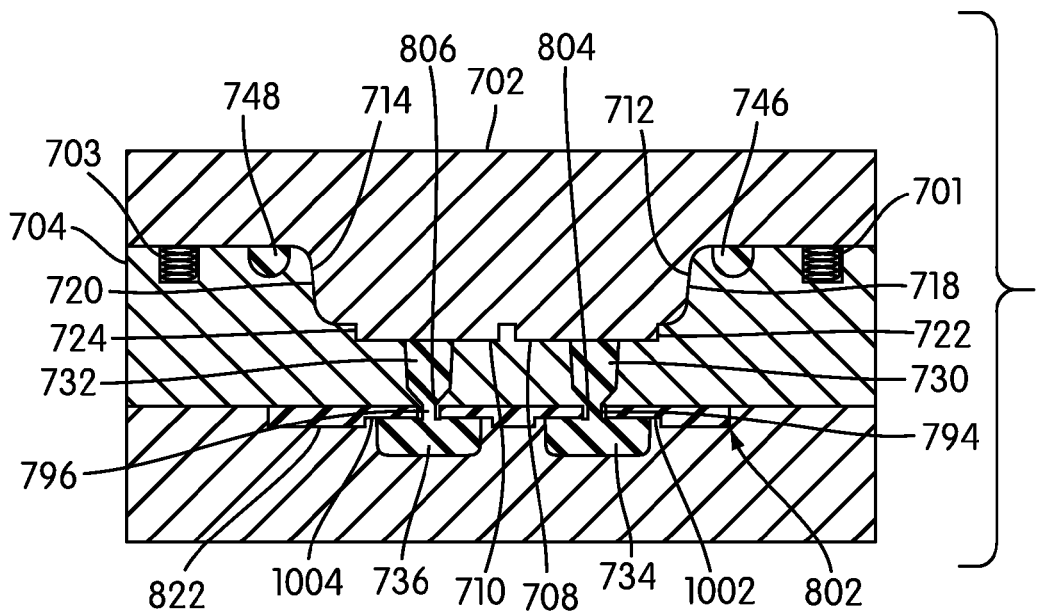
FIG. 10 is a schematic diagram of a preferred embodiment of the compression of molding press with central mold.

FIG. 10 is a schematic diagram of a preferred embodiment of the compression of molding press 702 with central mold 704. This compression, along with a heating process, liquefies first rubber forming block 902 and second rubber forming block 904. This liquid is then pressed through first injection cavity 730 and second injection cavity 732 into first lug cavity 734 and second lug cavity 736. Some of the liquid entering first injection cavity 730 enters first lug cavity 734, passing through first lining hole 804, via first lower orifice 794. Likewise, some of the liquid entering second injection cavity 732 eventually enters second lug cavity 736, passing through second lining hole 806, via second lower orifice 796. Simultaneously, excess material can be gathered in first molding recess 746 and second molding recess 748. In embodiments including first spring 701 and second spring 703, these springs may be depressed during this step of compression. In some embodiments first pressing surface 708 fits within first central cavity indent 722. Also second pressing surface 710 fits within second central cavity indent 724. In some embodiments first central cavity wall 718 is in contact with first extension wall 712. Also second central cavity wall 720 is in contact with second extension wall 714. Preferably, enough liquid or viscous substance is supplied to fill first lug cavity 734 and second lug cavity 736 in such a manner that the liquid or viscous substance is in contact with portions of second side 822 of matrix lining 802.

In a preferred embodiment of molding system 700, first lug cavity rim 1002, which preferably extends around the entire periphery of first lug cavity 734, is preferably in contact with matrix lining 802 under enough pressure so that no liquefied rubber escapes the region enclosed by first lug cavity rim 1002. In a similar manner, second lug cavity rim 1004, which preferably extends around the entire outer periphery of second lug cavity 736, is preferably in contact with matrix lining 802 under enough pressure so that no liquefied rubber escapes the region enclosed by second lug cavity rim 1004.

As the rubber material cools, it attaches to second side 822 of matrix lining 802. After the cooling of the rubber material is complete, central mold 704 can be separated from molding base 726, yielding tread assembly 1102, seen in FIG. 11. This separation can be performed by either lowering molding base 726 or raising central mold 704. What remains is tread assembly 502, which includes matrix lining 802 adjoined with first tread element 1104 and second tread element 1106. First tread element base 1110 of first tread element 1104 is no larger than the width of first lug cavity rim 1002 and second tread element base 1112 of second tread element 1106 is no larger than the width of second lug cavity rim 1004.

As some additional rubber material may be attached from rubber material which has solidified in first injection cavity 730 and second injection cavity 732, some means of removing this excess material may be desired. It is unlikely however that such excess material will interfere with the performance of tread assembly 1102. In this particular embodiment, first rubber projection 1104 and second rubber projection 1106 are rectangular in shape but any shape can be made using modified first lug cavity 734 and second lug cavity 736. Such shapes may include tetrahedrons, cylinders, or rectangles. Irregular shapes may also be used. Since the composition of first rubber forming block 902 and second rubber forming block 904 may be modified, the composition of first rubber projection 1104 and second rubber projection 1106 can likewise be modified. This is a useful attribute since some tread assemblies may require the use of more durable rubber, while others may require the use of more flexible material.

The size of lug cavities is also unrestricted in this method. Although first lug cavity 734 and second lug cavity 736 are identical in size and shape, this need not be true in other embodiments. Some embodiments may have lug cavities in a variety of shapes and sizes and lug cavities that are different from one another.

Figure 11:
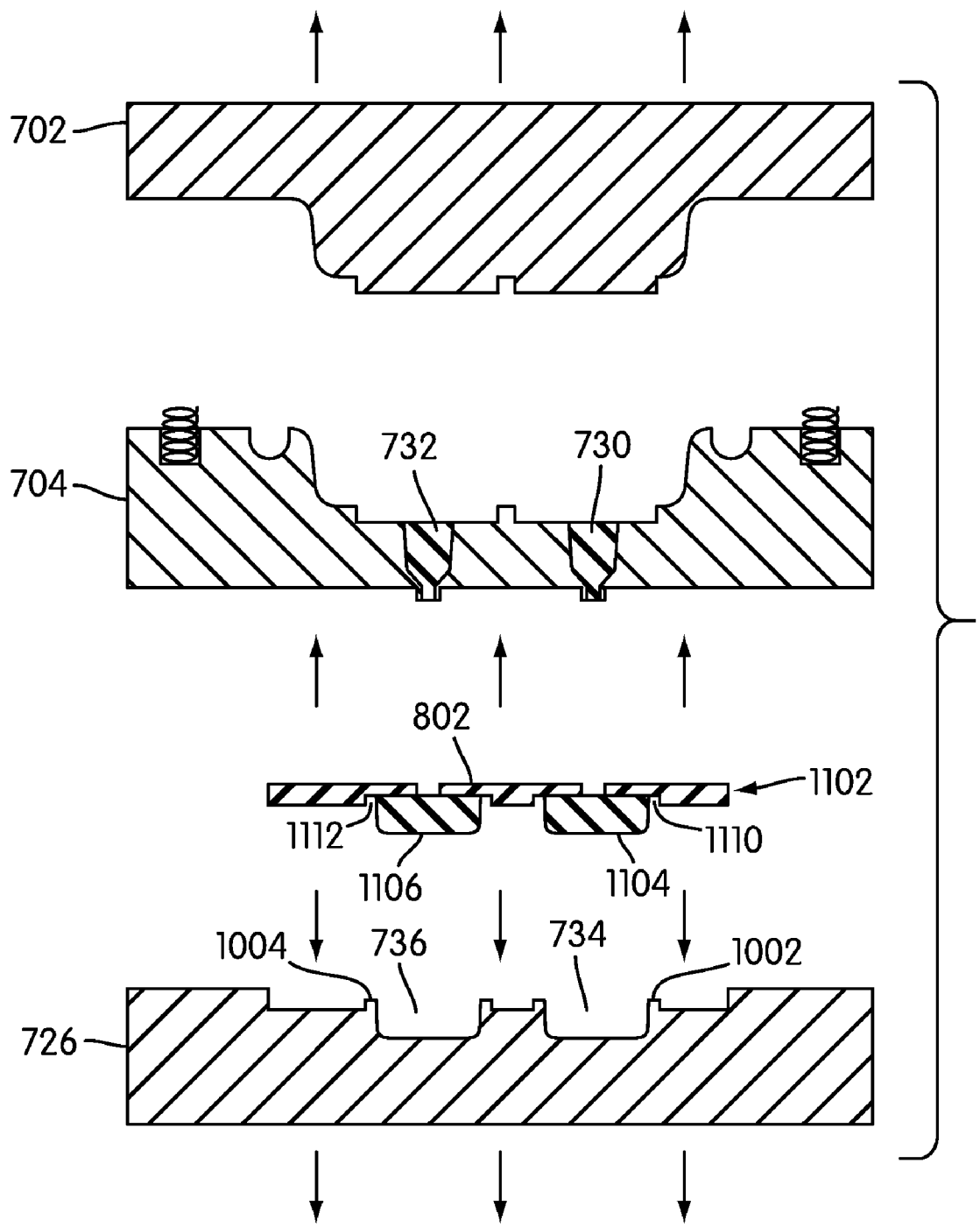
FIG. 11 is a schematic diagram of a preferred embodiment of a tread assembly.

Tread assembly 1102, as seen in FIG. 11, includes only two tread elements. In other embodiments, tread assembly 1102 may comprise a matrix lining with multiple tread elements. These tread elements could be simultaneously formed by modification of central mold 704 to include multiple injection cavities and lug cavities.

Figure 12:
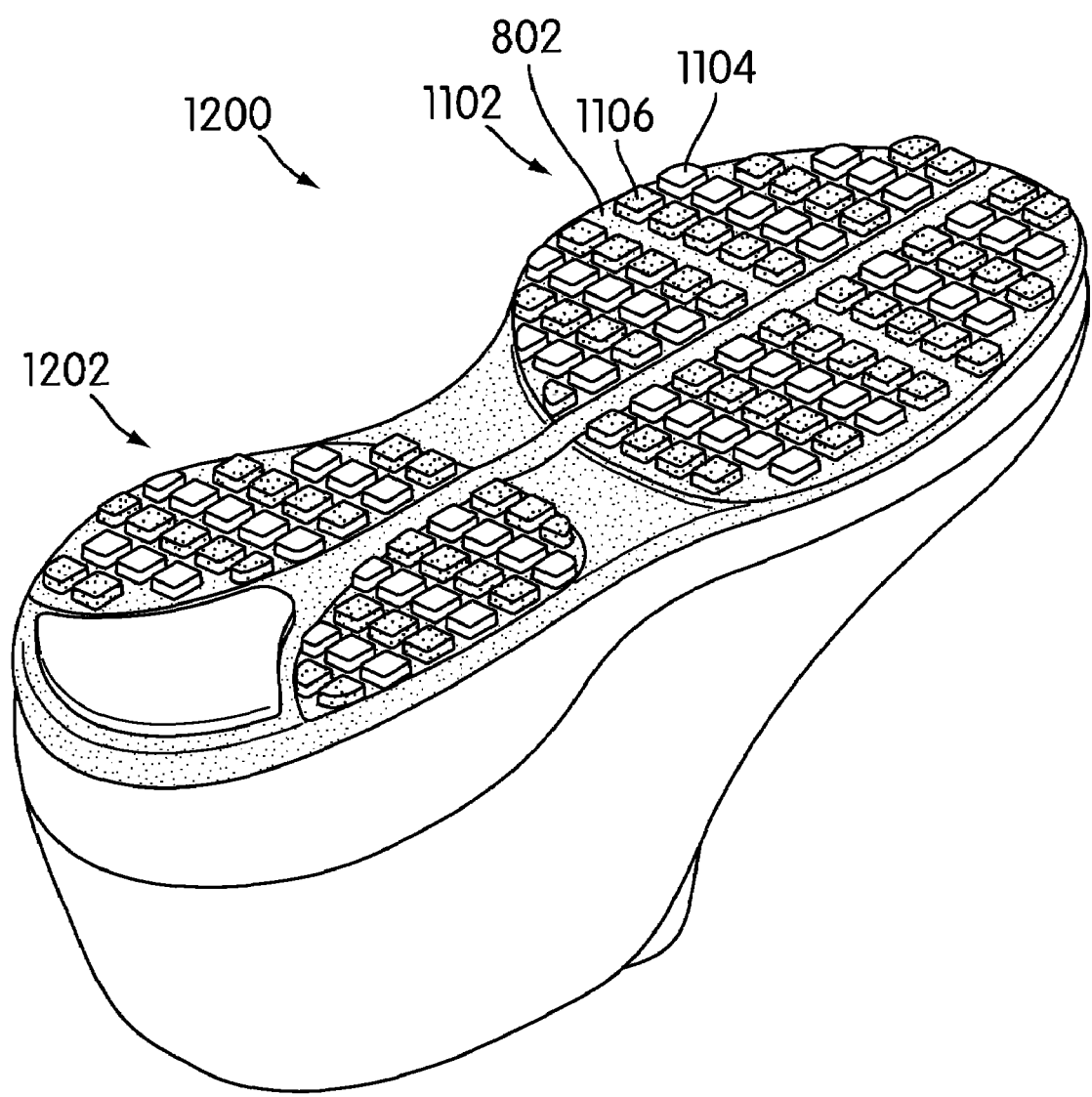
FIG. 12 is a preferred embodiment of a shoe with tread assembly displayed as an outsole.

FIG. 12 is a preferred embodiment of an article of footwear 1200. Here, tread assembly 1102 has been attached to article of footwear 1200 to form tread pattern 1202 of footwear 1200. Tread assembly 1102 includes first tread element 1104 and second tread element 1106. In this embodiment, matrix lining 802 has been attached directly to the bottom of article of footwear 1200. First tread element 1104 may be different in appearance and/or composition from second tread element 1106. Tread pattern 1202 of article of footwear 1200 can be any design, including various shapes and sizes of tread elements. As previously discussed, each tread element in article of footwear 1200 may comprise any color or material.

Figure 13:
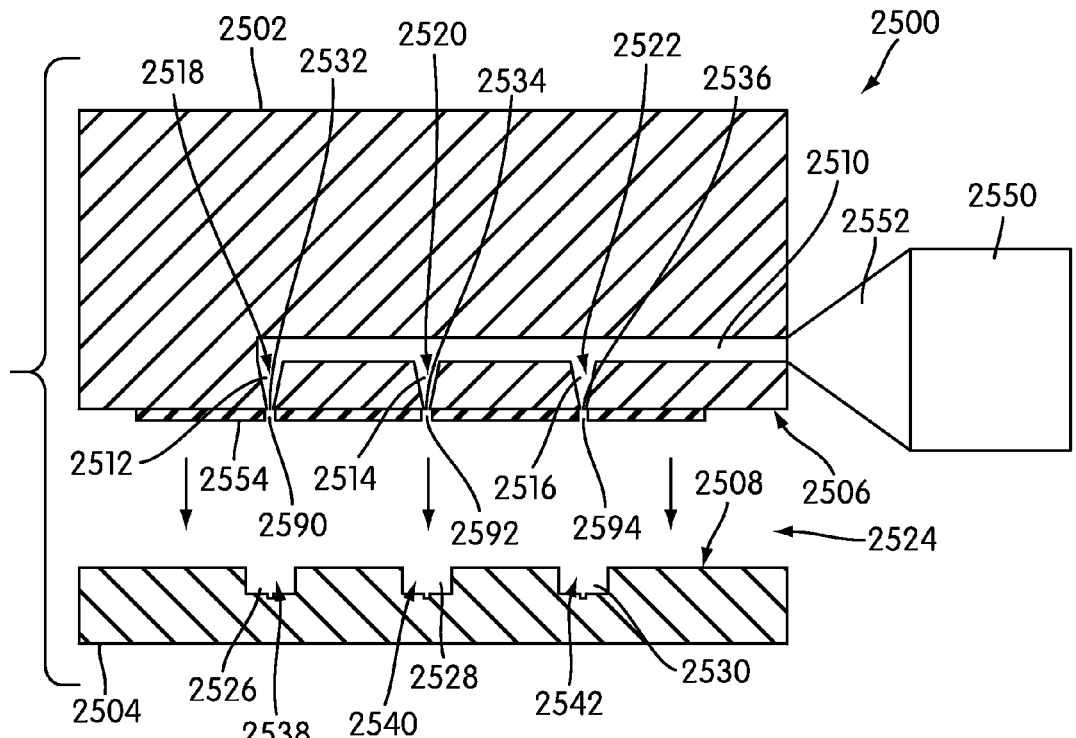
FIG. 13 is a schematic diagram of a preferred embodiment of a molding system with matrix lining attached.

FIG. 13 is a schematic diagram of a possible embodiment of a manufacturing system 2500 used to create a tread assembly. In this embodiment, rubber blocks that form the starting material in other embodiments are replaced with liquefied material that is directly injected into a lug cavity. Manufacturing system 2500 includes upper mold 2502 and molding base 2504. A first side 2506 of upper mold 2502 is preferably disposed adjacent to a first side 2508 of molding base 2504.

Upper mold 2502 preferably includes injection channel 2510. Upper mold 2502 also preferably includes first injection cavity 2512, second injection cavity 2514, and third injection cavity 2516. In a preferred embodiment, first injection cavity 2512 is in fluid communication with injection channel 2510 via first upper orifice 2518. Likewise, second injection cavity 2514 is preferably in fluid communication with injection channel 2510 via second upper orifice 2520. Likewise, third injection cavity 2516 is preferably in fluid communication with injection channel 2510 via third upper orifice 2522.

Manufacturing system 2500 also preferably includes provisions to accommodate or receive a matrix lining 2554. Matrix lining 2554 is preferably placed on upper mold 2502. Matrix lining 2554 may be attached to upper mold 2502 by sliding matrix lining 2554 into place, through gap 2524, or by first moving molding base 2504 away from upper mold 2502 and then returning molding base 2504 after matrix lining 2554 has been added. It may be preferable to fix matrix lining 2554 in place to assure proper alignment with first injection cavity 2512, second injection cavity 2514, and third injection cavity 2516. In some embodiments, matrix lining 2554 may be clamped to upper mold 2502 or fixed with an adhesive. Additionally, matrix lining 2506 preferably includes first hole 2590, second hole 2592, and third hole 2594.

Molding base 2504 preferably includes first lug cavity 2526, second lug cavity 2528, and third lug cavity 2530. First lug cavity 2526, second lug cavity 2528 and third lug cavity 2530 are all preferably exposed to gap 2524 via first lug opening 2538, second lug opening 2540, and third lug opening 2542.

Manufacturing system 2500 preferably includes screw injection machine 2550. Screw injection machine 2550 is preferably capable of pumping or moving liquefied material through injection channel 2510. In some embodiments, screw injection machine 2550 may include provisions to heat its liquefied contents. To move liquefied material to the various lug cavities, screw injection machine 2550 is preferably in fluid communication with injection channel 2510 via intermediate channel 2552.

The distance between molding base 2504 and upper mold 2502 may be varied. In particular, molding base 2504 and upper mold 2502 may be moved closer together or farther away. In some embodiments, molding base 2504 may be moved to contact upper mold 2402. In some embodiments, the items comprising manufacturing system 2500 may be made of a metallic material.

In the embodiment shown in FIG. 13 only three injection and lug cavities are shown, however in some embodiments many more injection and lug cavities may be included. In particular, first injection cavity 2512, second injection cavity 2514, and third injection cavity 2516 may be associated with a set of injection that may extend in the direction perpendicular to molding system 2500 as seen in FIG. 13. Likewise, first lug cavity 2526, second lug cavity 2528, and third lug cavity 2530 may be associated with a set of lug cavities that may extend in the direction perpendicular to molding system 2500 as seen in FIG. 13.

In the embodiment shown in FIG. 13, first lug cavity 2526, second lug cavity 2528, and third lug cavity 2530 are rectangular, however these cavities can assume any shape including, but not limited to, typical shapes found on the outsoles of articles of footwear.

Figure 14:
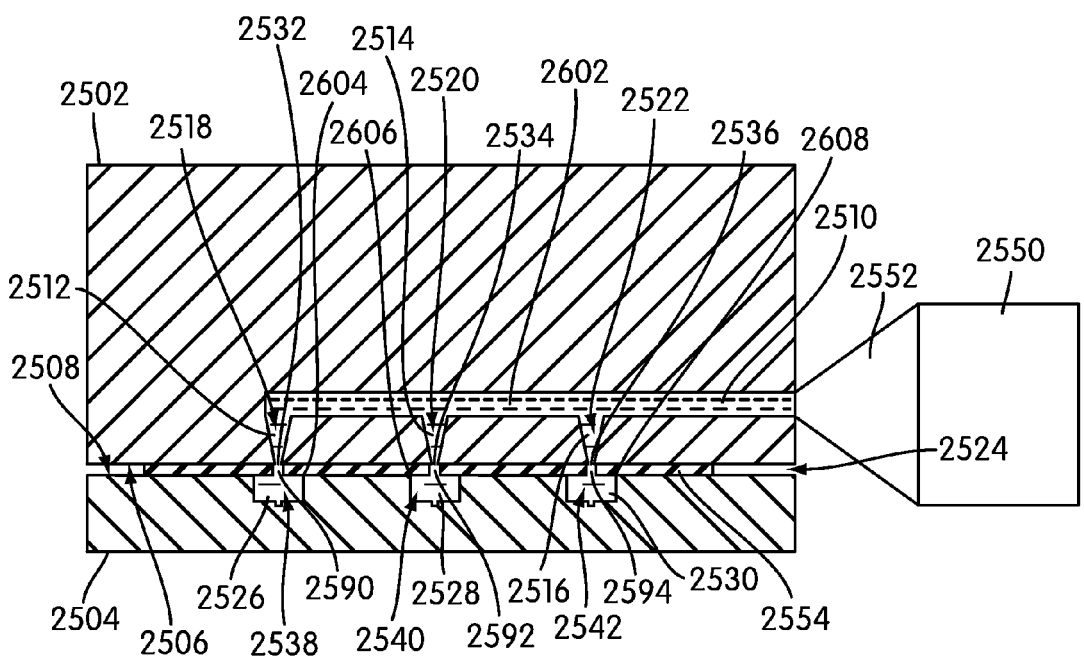
FIG. 14 is a schematic diagram of a preferred embodiment of the compression of the molding press with the central mold.

FIG. 14 is a preferred embodiment of another step in the manufacturing process, where the movement of upper mold 2502 towards molding base 2504 is accomplished. In some embodiments, portions of upper mold 2502 will be in contact with molding base 2504 after this movement step. Preferably, molding base 2504 will be positioned with respect to upper mold 2502 in such a way that matrix lining 2554 is exposed to first lug cavity 2526, second lug cavity 2528, and third lug cavity 2530.

First lug cavity 2526 is preferably in fluid communication with first injection cavity 2612 via first lower orifice 2532. In particular, first lower orifice 2532 is preferably aligned with first hole 2590, while first hole 2590 is disposed adjacent to first lug cavity 2526. This arrangement allows a liquid or viscous substance to pass between first injection cavity 2512 and first lug cavity 2526, through first hole 2590. Second lug cavity 2528 is preferably in fluid communication with second injection cavity 2520 via second lower orifice 2534. In particular, second lower orifice 2534 is preferably aligned with second hole 2592, while second hole 2592 is disposed adjacent to second lug cavity 2528. This arrangement allows a liquid or viscous substance to pass between second injection cavity 2514 and second lug cavity 2528, through second hole 2592. Third lug cavity 2530 is preferably in fluid communication with third injection cavity 2522 via third lower orifice 2536. In particular, third lower orifice 2536 is preferably aligned with third hole 2594, while third hole 2594 is disposed adjacent to third lug cavity 2530. This arrangement allows a liquid or viscous substance to pass between third injection cavity 2516 and third lug cavity 2530, through third hole 2594. In addition, first lug cavity 2526, second lug cavity 2528, and third lug cavity 2530 are all preferably exposed to portions of matrix lining 2554 via first lug opening 2538, second lug opening 2540, and third lug opening 2542 respectively.

During this step, a viscous material 2602 flows from screw injection machine 2550, through intermediate channel 2552, into injection channel 2510. From injection channel 2510, viscous material 2602 flows into first injection cavity 2512, second injection cavity 2514, and third injection cavity 2516. Viscous material 2602 then flows into first lug cavity 2526, second lug cavity 2528, and third lug cavity 2530. It is also possible to pre-position viscous material 2602 so that viscous material 2602 is near or in the injection cavities 2512, 2514 and 2516. To prevent the premature curing of viscous material 2602, upper mold 2502 may include provisions to heat viscous material 2602.

Viscous material 2602 may comprise Duralon©, or any blown rubber. Viscous material 2602 may also comprise other kinds of rubber. In general, viscous material 2602 may comprise any material that can flow and cure.

In a preferred embodiment of manufacturing system 2500, first lug cavity rim 2604, which preferably extends around the entire outer periphery of first lug cavity 2526, is preferably in contact with matrix lining 2554 under enough pressure so that no viscous material escapes the region enclosed by first lug cavity rim 2604. In a similar manner, second lug cavity rim 2606, which preferably extends around the entire outer periphery of second lug cavity 2528, is preferably in contact with matrix lining 2554 under enough pressure so that no viscous material escapes the region enclosed by second lug cavity rim 2606. In a similar manner, third lug cavity rim 2608, which preferably extends around the entire outer periphery of third lug cavity 2530, is preferably in contact with matrix lining 2554 under enough pressure so that no viscous material escapes the region enclosed by third lug cavity rim 2608.

Figure 15:
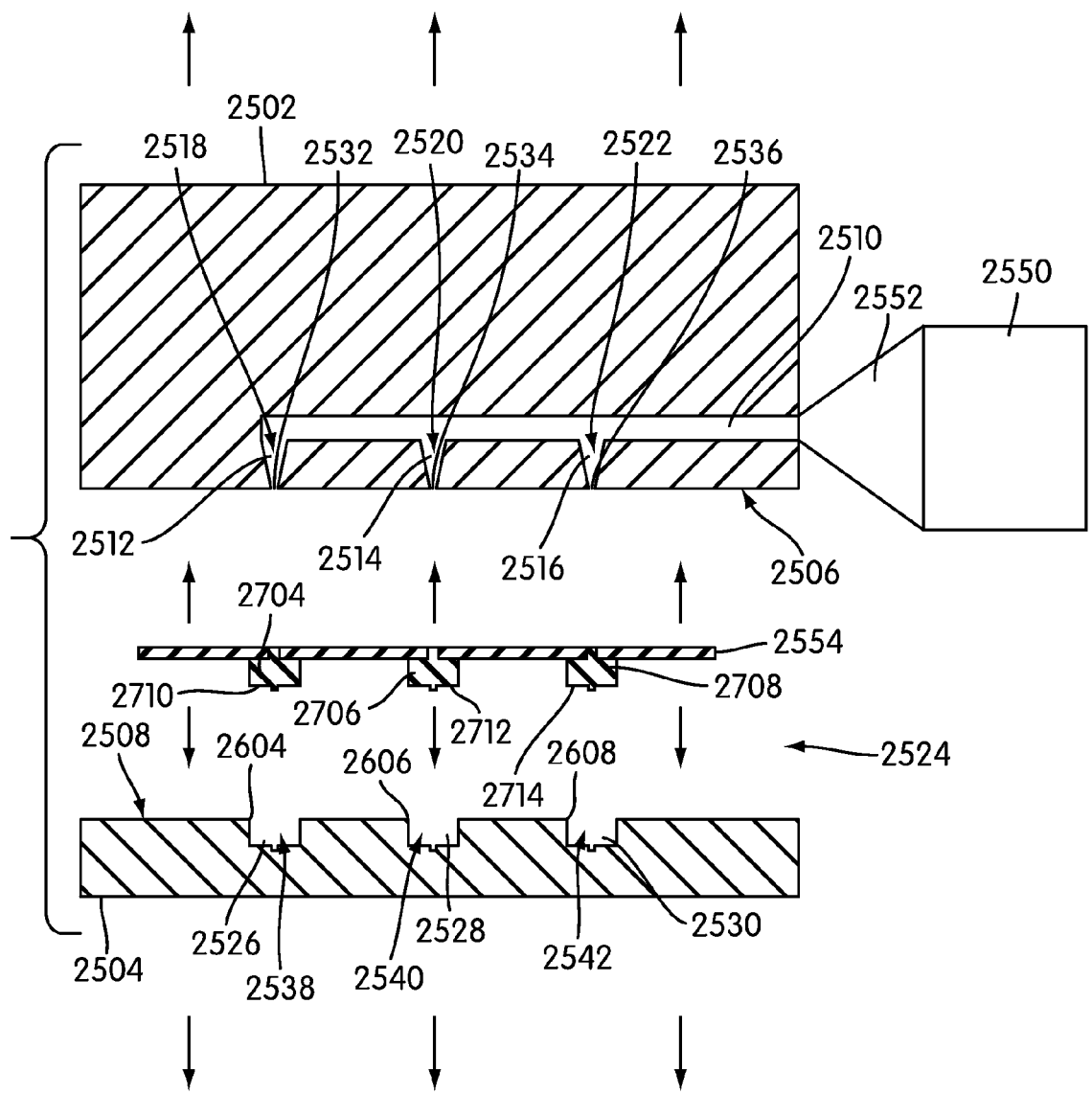
FIG. 15 is a schematic diagram of a preferred embodiment of a tread assembly.

Once viscous material 2602 has cooled, upper mold 2502 can be separated from molding base 2504, yielding tread assembly 2702, seen in FIG. 15. This separation can be performed by either lowering molding base 2504 or raising upper mold 2502. What remains is tread assembly 2702, which includes matrix lining 2554 adjoined with first tread element 2704, second tread element 2706, and third tread element 2708. First tread element base 2710 of first tread element 2704 is preferably no larger than the width of first lug cavity rim 2604. Second tread element base 2712 of second tread element 2706 is preferably no larger than the width of second lug cavity rim 2606. Third tread element base 2714 of third tread element 2708 is preferably no larger than the width of third lug cavity rim 2608.

As some additional rubber material may be attached from viscous material that has solidified in first injection cavity 2512, second injection cavity 2514, and third injection cavity 2616, some means of removing this excess material may be provided. It is unlikely however that such excess material will interfere with the performance of tread assembly 2702. In this particular embodiment, first tread element 2704, second tread element 2706, and third tread element 2708 are rectangular in shape but any shape can be made using first lug cavity 2526, second lug cavity 2528, and third lug cavity 2530. Such shapes may include tetrahedrons, cylinders, or rectangles. Irregular shapes may also be used.

The size of lug cavities is also unrestricted in this method. Although first lug cavity 2526, second lug cavity 2528, and third lug cavity 2530 are identical in size and shape, this need not be true in other embodiments. Some embodiments may have lug cavities in a variety of shapes and sizes and lug cavities that are different from one another.

Tread assembly 2702, as seen in FIG. 15, includes only two tread elements. In other embodiments, tread assembly 2702 may comprise a matrix lining with multiple tread elements. These tread elements could be simultaneously formed and joined to a matrix lining by modification of upper mold 2502 to include multiple injection cavities and lug cavities. Tread assembly 2702 may be attached to the outsole of an article of footwear in an identical manner as has been shown in previous embodiments.

Using this manufacturing process 2500, precise amounts of viscous material 2602 can be dispensed and waste of viscous material 2602 can be dramatically reduced. This manufacturing process 2500 also can increase the speed of production by eliminating the step of placing a rubber forming block.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of making an article of footwear comprising the steps of:

associating a matrix lining with a first side of a central mold, a first surface of the matrix lining confronting the first side of the central mold, the matrix lining also including a second surface disposed opposite the first surface, the matrix lining defining at least one hole;

associating a lug cavity with the second surface of the matrix lining, a rim of the lug cavity surrounding the lug cavity and pressing the matrix lining against the first side of the central mold;

placing a rubber forming block proximate a second side of the central mold;

compressing the rubber forming block and causing a portion of the rubber forming block to become viscous and flow through at least one injection cavity disposed in the central mold and through at least one injection tip aligned with and inserted into the at least one hole in the matrix lining;

the portion of the rubber forming block continuing to flow through the at least one hole disposed in the matrix lining and flowing into the lug cavity; and wherein the portion of the rubber forming block fills the lug cavity and contacts the second surface of the matrix lining.

2. The method according to claim 1, wherein the step of compressing the rubber forming block includes a step of moving a molding press towards the central mold.

3. The method according to claim 1, further comprising the step of separating the matrix lining from the mold, any excess rubber forming block being removed such that the rubber forming block does not extend beyond the first surface of the matrix lining.

4. The method according to claim 1, wherein the lug cavity is disposed on a molding base.

5. The method according to claim 1, wherein the portion of the rubber forming block becomes a tread element and the rim of the lug cavity forms a tread element base on the matrix lining surrounding the tread element.

6. The method according to claim 5, wherein the matrix lining is attached to an outsole of the article of footwear.

7. The method according to claim 1, wherein the first associating step comprises removably fixing the matrix lining to the central mold before compressing the rubber block.

8. A method of making an article of footwear comprising the steps of:

associating a matrix lining with a first side of a central mold, a first surface of the matrix lining confronting the first side of the central mold, the matrix lining also including a second surface disposed opposite the first surface, the matrix lining defining at least two holes;

associating a molding base with the second surface of the matrix lining, the molding base defining a first lug cavity having a first lug cavity rim surrounding the first lug cavity and a second lug cavity having a second lug cavity rim surrounding the second lug cavity, each lug cavity rim pressing against the matrix lining against the first side of the central mold;

placing a first rubber forming block proximate a second side of the central mold;

placing a second rubber forming block proximate the second side of the central mold, wherein the second rubber forming block is different than the first rubber forming block;

compressing the first rubber forming block and causing a first portion of the first rubber forming block to become viscous and flow through a first injection cavity disposed in the central mold and through at least one injection tip aligned with and inserted into one of the at least two holes in the matrix lining;

compressing the second rubber forming block and causing a second portion of the second rubber forming block to become viscous and flow through a second injection cavity disposed in the central mold and through a second at least one injection tip aligned with and inserted into a second one of the at least two holes in the matrix lining;

wherein the first portion of the first rubber forming block fills the first lug cavity and contacts the second surface of the matrix lining, and wherein the second portion of the second rubber forming block fills the second lug cavity and contacts the second surface of the matrix lining.

9. The method according to claim 8, wherein the step of compressing the rubber forming block includes a step of moving a molding press towards the central mold.

10. The method according to claim 8, wherein the first rubber forming block is placed in a first central cavity indent and wherein the second rubber forming block is placed in a second cavity indent.

11. The method according to claim 10, wherein a first pressing surface disposed on molding press is configured to engage the first central cavity indent and wherein a second pressing surface disposed on the molding press is configured to engage the second central cavity indent.

12. The method according to claim 8, wherein the first lug cavity is laterally spaced from the second lug cavity.

13. The method according to claim 8, wherein the first lug cavity rim presses the matrix lining to form a first tread element base and the second lug cavity rim presses the matrix lining to form a second tread element base.

14. The method according to claim 8, wherein the matrix lining is attached to an outsole of the article of footwear.

15. The method according to claim 8, wherein the first associating step comprises removably fixing the matrix lining to the central mold before compressing the rubber block.

16. A method of making an article of footwear comprising the steps of:

positioning a molding base adjacent a first side of a central mold, a matrix lining being positioned between the central mold and the molding base, the mold in base defining at least one cavity having a rim surrounding the cavity, the rim pressing the matrix lining against the central mold;

placing a first rubber forming block proximate a second side of the central mold and placing a second rubber forming block proximate the second side of the central mold, wherein the second rubber forming block is different than the first rubber forming block;

compressing both the first rubber forming block and the second rubber forming block simultaneously;

thereby causing a first portion of the first rubber forming block to become viscous and flow through an injection tip aligned with and positioned in a corresponding hole in the matrix lining and also causing a second portion of the second rubber forming block to become viscous and flow through a second injection tip aligned with and positioned in a second corresponding hole in the matrix lining.

17. The method according to claim 16, wherein the first portion of the first rubber forming block flows through a first injection cavity after the compression step.

18. The method according to claim 16, wherein the second portion of the second rubber forming block flows through a second injection cavity after the compression step.

19. The method according to claim 16, wherein the first rubber forming block is harder than the second rubber forming block.

20. The method according to claim 16, wherein the first rubber forming block has a different color than the second rubber forming block.

21. The method according to claim 16, wherein the first rubber forming block has a different composition than the second rubber forming block.

22. The method according to claim 16, wherein the matrix lining is attached to an outsole of an article of footwear.

23. The method according to claim 16, further comprising gathering at least a first excess material from one of the first and second rubber forming blocks in a first molding recess.

24. The method according to claim 23, further comprising further comprising gathering a second excess material from the other of the first and second rubber forming blocks in a second molding recess.

25. A method of making an article of footwear comprising the steps of:

associating a matrix lining with a first side of a central mold, a first surface of the matrix lining confronting the first side of the central mold, the matrix lining also including a second surface disposed opposite the first surface;

associating a molding base with the second surface of the matrix lining, the molding base including at least one lug cavity and at least one lug cavity rim surrounding the at least one lug cavity, the at least one lug cavity rim pressing against the second surface of the matrix lining;

placing a rubber forming block proximate a second side of the central mold;

compressing the rubber forming block and causing a portion of the rubber forming block to become viscous and flow through at least one injection cavity disposed in the central mold;

the portion of the rubber forming block continuing to flow through a hole disposed in the matrix lining and flowing into the at least one lug cavity;

wherein the portion of the rubber forming block fills the lug cavity and contacts the second surface of the matrix lining, the matrix lining extending beyond the rim of the at least one lug cavity; and wherein an edge of the matrix lining remains exposed.

26. The method according to claim 25, wherein the matrix lining is attached to an outsole of an article of footwear and only a portion of the second surface of the matrix lining remains exposed.

27. The method according to claim 25, further comprising forming a recessed base in the matrix lining by pressing the rim of the at least one lug cavity against the matrix lining.

28. A method of making an article of footwear comprising the steps of:
- associating a matrix lining with a first side of a central mold, a first surface of the matrix lining confronting the first side of the central mold, the matrix lining also including a second surface disposed opposite the first surface, the matrix lining defining at least one hole;
- associating a lug cavity with the second surface of the matrix lining, the lug cavity having a lug cavity rim surrounding the lug cavity and pressing the matrix lining against the central mold;
- placing a rubber forming block proximate a second side of the central mold;
- compressing the rubber forming block and causing a portion of the rubber forming block to become viscous and flow through at least one injection cavity disposed in the central mold and through at least one injection tip aligned with and inserted into the at least one hole in the matrix lining;
- the portion of the rubber forming block continuing to flow through the at least one hole disposed in the matrix lining and flowing into the lug cavity; and
- wherein the portion of the rubber forming block fills the lug cavity and contacts the second surface of the matrix lining, the matrix lining extending beyond the rim of the lug cavity.

29. The method according to claim 28, wherein the matrix lining is attached to an outsole of an article of footwear and only a portion of the second surface of the matrix lining remains exposed.

30. The method according to claim 29, wherein the exposed portion of the second surface of the matrix lining includes an edge of the matrix lining.

31. The method according to claim 28, wherein the step of pressing the matrix lining against the central mold forms a base in the matrix lining adjacent the at least one hole.

32. A method of making an article of footwear comprising the steps of:
- associating a matrix lining with a first side of a plurality of injection cavities, a first surface of the matrix lining confronting the first side of each injection cavity, the matrix lining also including a second surface disposed opposite the first surface, the matrix lining defining at least one hole;
- associating a lug cavity with the second surface of the matrix lining, the lug cavity having a lug cavity rim surrounding the lug cavity and pressing against the matrix lining;
- placing a corresponding plurality of rubber forming blocks proximate a second side of each injection cavity;
- compressing the rubber forming blocks and causing a portion of each rubber forming block to become viscous and flow through at least one injection cavity and through at least one injection tip aligned with and inserted into a corresponding at least one hole in the matrix lining; and
- the portion of the corresponding rubber forming block continuing to flowing through the at least one hole disposed in the matrix lining and flowing into the lug cavity.

33. The method according to claim 32, further comprising gathering at least a first excess material from one of the plurality of rubber forming blocks in a first molding recess.

34. The method according to claim 33, further comprising further comprising gathering a second excess material from another of the plurality of rubber forming blocks in a second molding recess.

35. The method according to claim 32, further comprising preventing an excess material from flowing past the lug cavity by pressing the rim against the matrix lining, thereby creating a tread element base surrounding a tread element.

* * * * *